United States Patent [19]

Martin

[11] Patent Number: 5,130,070
[45] Date of Patent: Jul. 14, 1992

[54] METHOD OF REVERSE DEGASSING AN EXTRUSION MELT AND AN EXTRUSION DEVICE THEREFOR

[75] Inventor: Gerhard Martin, Hanover, Fed. Rep. of Germany

[73] Assignee: Hermann Berstorff Maschinenbau GmbH, Hanover, Fed. Rep. of Germany

[21] Appl. No.: 708,192

[22] Filed: May 31, 1991

[30] Foreign Application Priority Data

Jun. 1, 1990 [DE] Fed. Rep. of Germany ....... 4017724

[51] Int. Cl.$^5$ .............................................. B29C 47/76
[52] U.S. Cl. ..................... 264/102; 159/2.2; 366/75; 366/88; 366/76; 425/203
[58] Field of Search ............... 264/102, 101, DIG. 78, 264/37; 425/203, 208; 366/75, 76, 88; 159/2.2, 2.3

[56] References Cited

U.S. PATENT DOCUMENTS

| | | | |
|---|---|---|---|
| 3,376,603 | 4/1968 | Colombo | 425/203 |
| 3,416,189 | 12/1968 | Welt | 425/376.1 |
| 3,712,594 | 1/1973 | Schippers et al. | 425/208 |
| 4,197,268 | 4/1980 | Anders | 264/102 |
| 4,265,547 | 5/1981 | Martin | 366/75 |
| 4,900,494 | 2/1990 | Wobbe | 366/75 |
| 4,902,455 | 2/1990 | Wobbe | 425/203 |

FOREIGN PATENT DOCUMENTS

| | | | |
|---|---|---|---|
| 2657432 | 6/1977 | Fed. Rep. of Germany | 425/208 |
| 3615609C2 | 11/1987 | Fed. Rep. of Germany | |
| 1141054 | 8/1957 | France | 425/376.1 |

Primary Examiner—Jeffrey Thurlow
Attorney, Agent, or Firm—Foley & Lardner

[57] ABSTRACT

A method for reverse degassing a melt of thermoplastic plastics material and an extrusion device therefor. Thermoplastic plastics materials are fed into the extrusion device either in the form a melt or as a granulated, which latter is fused to form a melt. A portion of the melt is separated from the main melt stream. The extrusion device includes, in a downstream direction, a return-blocking zone, a degassing zone, a feed zone and a conveying zone. The separated portion is removed from the feed zone, the conveying zone or even a feed conduit leading into the feed zone if the material is already molten. The extrusion device also includes screw means rotating in a barrel. The screw has at least two different flight portions, one in the returning-blocking zone and the other in at least the degassing zone. The separated melt portion is fed, through a by-pass conduit, into the return-blocking zone in an amount sufficient to fill the screw flight in this zone but which only partially fills the screw flight in the degassing zone when it is transferred thereunto, by the screw means, from the return-blocking zone. The partially-filling of the flight in the degassing zone must, however, be sufficient to ensure continued conveyance of the melt into the downstream feed and conveying zones.

5 Claims, 1 Drawing Sheet

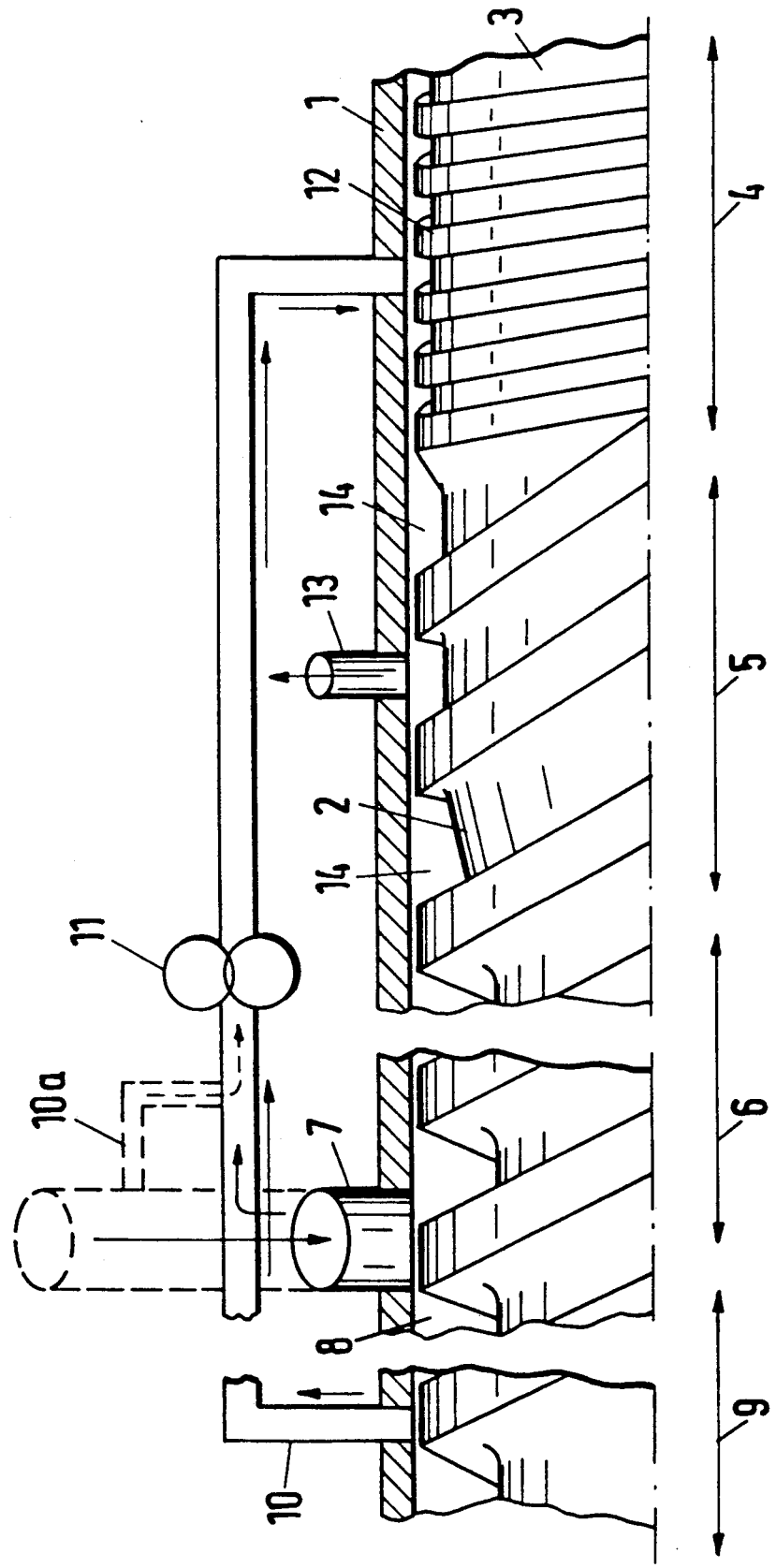

METHOD OF REVERSE DEGASSING AN EXTRUSION MELT AND AN EXTRUSION DEVICE THEREFOR

FIELD OF THE INVENTION

The present invention relates to a method of reverse degassing a melt in an extrusion device and to an extrusion device in which such reverse degassing can be effected.

BACKGROUND OF THE INVENTION AND PRIOR ART DISCUSSION

Screw extruders which comprise a screw device mounted for rotation in, and surrounded by a barrel are well known. Such extruders have a feed aperture for the material to be treated, an outlet for the treated material downstream of such feed aperture, a drive unit for the screw located upstream of the feed aperture, and reverse degassing arrangement which is disposed between the feed aperture and the drive unit.

The material to be treated, such as a melt produced during a polymerisation process, is usually supplied to such an extrusion device from, for example, the reactor in which the polymerisation is effected, at a temperature in excess of 150° C. The melt is entrained by the flights of the screw device and is forced to travel along a prescribed path in the conveying direction of the screw extruder. Gases contained therein and small portions of melt such as oligomers can escape from the melt. This is due to the fact that a gap is formed between the screw and the barrel or, if sealing elements are provided in the barrel, around the sealing elements. These gaseous and small solid portions tend to travel in a direction opposite the main flows of the melt, that is to say, towards the drive unit.

In many cases, the extrusion screw device is provided with a return winding at the end of the extrusion housing. This prevents excessively large quantities of the polymerised substances from passing into the drive gear.

An extruder incorporating a degassing arrangement is disclosed in German Patent Specification No. DE 3 615 609 C2. The degassing arrangement disclosed therein is formed from a stuffer-box housing, which covers and seals the screw shaft and is connected to the barrel of the extruder. The end of the internal wall of the housing which faces the barrel is provided with a helical groove, which groove extends in the opposite direction to the screw flight. In communication therewith is an accentric annular chamber, from which one or a plurality of apertures extend. However, the disadvantage of this known degassing arrangement is that it cannot be universally used for any melt. Extrusion screws are used, which have a return flight at the inlet to the degassing arrangement. The degassed material has a relatively long dwell-time in the region of the return flight and, when the product is returned from the degassing region into the main product stream, material is deposited. This is particularly disadvantageous if thermally unstable products are being treated.

An additional disadvantage of such a known degassing arrangement is that the reverse degassing chamber is easily blocked if products having a high melt-flow index and/or copolymerised substances are being treated. These have the disadvantageous properly of adhering to metals, and the efficiency of the reverse degassing is adversely affected by such adhesion.

OBJECTS OF THE INVENTION

The present invention seeks to provide a method of reverse degassing plastics materials in screw extruders which is more effective than the known methods. In particular, the present invention seeks to provide a method of reverse degassing which prevents the build-up of deposits and the like and, in general, precludes the possibility of any side-effects occurring which would adversely affect the efficiency thereof.

SUMMARY OF THE INVENTION

According to the present invention, there is provided a method of reverse degassing a melt of thermoplastic plastics material in an extrusion device, said extrusion device comprising a cylindrical barrel, said barrel including an internal surface defining a hollow interior, and screw means mounted for rotation in said hollow interior of said barrel; said screw means and said internal surface of said barrel jointly defining a plurality of treatment zones for said melt, said treatment zones comprising:-

(a) a feed zone for receiving said thermoplastic plastics material; said extrusion device further including feed conduit means communication with said feed zone;

(b) a conveying zone located downstream of said feed zone for receiving said fed thermoplastic plastics material and communicating with said feed zone and for conveying said melt in a downstream direction;

(c) a reverse degassing zone located upstream of said feed zone and communicating with said feed zone, said extrusion device further including a degassing conduit communicating with said degassing zone and means for producing a low pressure communicating with said degassing conduit; and (d) a return blocking zone located upstream of said reverse degassing zone;

said extrusion device further comprising by-pass conduit means communicating with said return blocking zone for supplying a portion of said melt to said return blocking zone and metering means associated with said by-pass conduit means for controlling the quantity of said portion of said melt supplied to said returning blocking zone; and drive means operatively connected to said screw means in said return-blocking zone wherein said screw means comprises screw core means and at least first and second screw flight portions helically disposed around said screw core means wherein said first screw flight portion is located in said returning blocking zone and said second flight portion is located in at least said reverse degassing zone; said screw flight portions each defining a screw pitch wherein said screw pitch defined by said first flight portion is smaller than said screw pitch defined by said second flight portion;

said method comprising the steps of:

(a) producing a melt stream of thermoplastic plastics material;

(b) separating a sub-stream of said material from said melt stream;

(c) transferring said sub-stream to said return blocking zone through said by-pass conduit means;

(d) controlling the amount of said transferred material such that said material completely fills said blocking return zone but, on passing from said blocking return zone into said degassing zone, only partially fills said degassing zone whilst simultaneously ensuring that said material is present in sufficient quantity in said degassing zone to be conveyed therethrough by said screw means; and (e) degassing said material in said degassing zone.

Also according to the present invention, there is provided an extrusion device including means for degassing a melt of thermoplastic plastics material, said extrusion device comprising a cylindrical barrel, said barrel including an internal surface defining a hollow interior, and screw means mounted for rotation in said hollow interior of said barrel; said screw means and said internal surface of said barrel jointly defining a plurality of treatment zones for said melt, said treatment zones comprising:-

(a) a feed zone for receiving said thermoplastic plastics material; said extrusion device further including feed conduit means communication with said feed zone;

(b) a conveying zone located downstream of said feed zone for receiving said fed thermoplastic plastics material and communicating with said feed zones and for conveying said melt in a downstream direction;

(c) a reverse degassing zone located upstream of said feed zoned and communicating with said feed zone, said extrusion device further including a degassing conduit communicating with said degassing zone and means for producing a low pressure communicating with said degassing conduit; and (d) a return blocking zone located upstream of said reverse degassing zone;

said extrusion device further comprising by-pass conduit means communicating with said return blocking zone for supplying a portion of said melt to said return blocking zone and metering means associated with said by-pass conduit means for controlling the quantity of said portion of said melt supplied to said returning to said zone; and drive means operatively connected to said screw means in said return-blocking zone wherein said screw means comprises screw core means and at least first and second screw flight portions helically disposed around said screw core means wherein said first screw flight portion is located in said returning blocking zone and said second flight portion is located in at least said reverse degassing zone; said screw flight portions each defining a screw pitch wherein said screw pitch defined by said first flight portion is smaller than said screw pitch defined by said second flight portion;

By removing a stream of the molten material, which may or may not have been degassed, from the downstream portions of the extrusion device and returning the stream to the return-blocking zone in such an amount as to fill completely this latter zone, a seal is formed by the material in the return-blocking zone. This seal prevents gas from entering the drive means for the screw and causing harmful effects. The screw flight in the return-blocking zone is helical and conveys material in a downstream direction towards the degassing, feed and conveying zone. It is preferred if the pitch of the screw flight in the return-blocking zone is approximately half the pitch of the screw flight in, at least, the degassing zone.

The flight of the screw in the blocking-return zone is preferably not as deep as the flight of the screw in, particularly, the conveying zone. The quantity of melt conveyed through the return-blocking zone amounts to approximately 5% to 50% of the quantity which could be conveyed by the screw flight in the region of the reverse degassing aperture. This ensures that the screw flight in the region of the reverse degassing aperture is always only partially filled. By so doing, there always remains a free path in the flight, which path communicate with the degassing aperture and allows residual monomers or the like in the melt to be removed through the aperture by suction means. The amount of melt separated from the main stream of the melt may be made dependent upon the rotational speed of the extrusion screw, to ensure that the screw flight in the degassing zone is always partially filled.

A reverse degassing arrangement so constructed operates satisfactorily at any rotational speed of the screw. In consequence, when the return-blocking flight is completely filled, thereby providing a gas-tight seal relative to the screw drive means, a quantity of melt is conveyed by the return-blocking flight, then through the degassing and feed zones and into the conveying zone.

Such quantity always ensures only a partial filling of the flight in the degassing and feed zones, with the result that gases flow freely to the reverse degassing arrangement whereat they are removed by suction.

On the other hand, the partial filling ensures that a melt return operation occurs and, in consequence, any deposits, which have been formed on the flight portions of the screw and on the internal wall of the barrel by the removal of the residual monomers by suction, are reliably returned to the conveying zone. This is not the case in many known reverse degassing systems, with the result that deposits left by the gaseous residual monomers cause, sooner or later, the screw flights to become blocked. Such blocking, in turn, also causes the reverse degassing aperture to become blocked.

According to the invention, the amount of melt conveyed in the screw flight in the region of the reverse degassing aperture is such that another return operation occurs. Nevertheless, there still remains sufficient free space in the flights in ensure an interruption-free withdrawal of the gaseous residual monomers, despite the fact that deposits of the monomers are always present in the screw flight.

BRIEF DESCRIPTION OF THE DRAWINGS

One embodiment of an extrusion device in accordance with the present invention and in which the method of the present invention can be effected, will be further described, by way of example, with reference to the accompanying drawing, the single Figure of which show a schematic longitudinal fragmentary view of an extrusion device.

In the Figure, there is shown an extrusion device which comprises an extrusion housing 1 in the form of a barrel. A screw 2 is mounted for rotation within the barrel 1. The screw has an upstream end region 3 and a drive and geared transmission unit (not shown) for rotating the screw 2 are provided in such end region 3.

As shown in the Figure, the screw portion 2 comprises, in sequence downstream from the upstream end 3 thereof, a return-blocking flight zone 4, the reverse degassing flight zone 5, a material intake zone 6 and a conveyor zone 9. In the conveyor zone 9, an extrusion chamber 8 is defined between the barrel 1 and the screw 2.

A melt or a granulated substance is fed into the extrusion chamber 8 through a material feed aperture 7. Downstream of the aperture 7, that is to say, in the extrusion zone 9, a portion of the melt is removed from the chamber 8 through a branch conduit 10. Alternatively, a branch conduit 10a may be provided in the inlet conduit for the material leading to the aperture 7.

This latter arrangement can, obviously, only be used if the feed material is in a molten state. Such removed portion of the melt is fed into the blocking flight zone 4 utilising a gear pump 11. The pump 11 may also be used as a metering pump if the pressure of the melt is detected as exceeding a predetermined value.

The output of the pump is so selected that the return-blocking flight 12 in the zone 4 is always filled to its maximum level with melt, which is conveyed from such region in a direction towards the extrusion chamber 8. In consequence, an absolutely gas-tight seal relative to the drive and gear unit for the screw 2 is produced.

The material conveyed by the flight 12 enters the degassing zone 5. Such zone 5 includes a degassing aperture 13 connected to a source of low pressure or vacuum. To keep the aperture 13 operationally effective at any time, it should be ensured that the screw flights 14 in the reverse degassing region 5 are not completely filled with melt. If such flights 14 are completely filled, residual monomers and the like cannot be removed through the reverse degassing aperture 13. In consequence, the free flight volume in the degassing zone must be so dimensioned that the quantity of melt conveyed thereto by the flight 12 only effects a partial filling of the flight 14. On the other hand, there must be sufficient melt in the flight 14 to ensure that conveyance of the melt occurs. In this respect, a conveying operation includes the melt being moved along the internal wall of the barrel by the rotating screw, whereby both the melt and deposits of the residual monomers, on both the internal wall of the barrel and on the screw surface, are collected and returned to the extrusion chamber 8.

I claim:

1. A method of reverse degassing a melt of thermoplastic plastics material in an extrusion device, and extrusion device comprising a cylindrical barrel, said barrel including an internal surface defining a hollow interior, and screw means mounted for rotation in said hollow interior of said barrel; said screw means and said internal surface of said barrel jointly defining a plurality of treatment zones comprising:
   (a) a feed zone for receiving said thermoplastic plastics material; said extrusion device further including feed conduit means communication with said feed zone;
   (b) a conveying zone located downstream of said feed zone for receiving said feed thermoplastic plastics material and communicating with said feed zone and for conveying said melt in a downstream direction;
   (c) a reverse degassing zone located upstream of said feed zone and communicating with said feed zone, said extrusion device further including a degassing conduit communicating with said degassing zone and means for producing a low pressure communicating with said degassing conduit; and
   (d) a return blocking zone located upstream of said reverse degassing zone;
   said extrusion device further comprising by-pass conduit means communicating with said return blocking zone for supplying a portion of said melt to said return blocking zone, and metering means in the form of a gear pump associated with said by-pass conduit means for controlling the quantity of said portion of said melt supplied to said returning blocking zone; and drive means operatively connected to said screw means in said return-blocking zone, wherein said screw means comprises screw core means and at least first and second screw flight portions helically disposed around said screw core means, wherein said first screw flight portion is located in said returning blocking zone and said second flight portion is located in at least said reverse degassing zone; said screw flight portions each defining a screw pitch wherein said screw pitch defined by said first flight portion is smaller than said screw pitch defined by said second flight portion;

said method comprising the steps of:
   (a) producing a melt stream of thermoplastic plastics material;
   (b) separating a sub-stream of said material from said melt stream;
   (c) transferring said sub-stream to said return blocking zone through said by-pass conduit means;
   (d) controlling the amount of said transferred material such that said material completely fills said blocking return zone into said degassing zone, but on passing from said blocking return zone into said degassing zone, only partially fills said degassing zone while simultaneously ensuring that said material is present in sufficient quantity in said degassing zone to be conveyed therethrough by said screw means; and
   (e) degassing said material in said degassing zone.

2. An extrusion device including means for degassing a melt of thermoplastic plastics material, said extrusion device comprising a cylindrical barrel, said barrel including an internal surface defining a hollow interior, and screw means mounted for rotation in said hollow interior of said barrel; said screw means and said internal surface of said barrel jointly defining a plurality of treatment zones for said melt, said treatment zones comprising:
   (a) a feed zone for receiving said thermoplastic plastics material; said extrusion device further including feed conduit means in communication with said feed zone;
   (b) a conveying zone located downstream of said feed zone for receiving said fed thermoplastic plastics material and communicating with said feed zone and for conveying said melt in a downstream direction;
   (c) a reverse degassing zone located upstream of said feed zone and communicating with said feed zone, said extrusion device further including a degassing conduit communicating with said degassing zone and means for producing a low pressure communicating with said degassing conduit; and
   (d) a return blocking zone located upstream of said reverse degassing zone;
   said extrusion device further comprising by-pass conduit means communicating with said return blocking zone for supplying a portion of said melt to said return blocking zone, and metering means in the form of a gear pump associated with said by-pass conduit means for controlling the quantity of said portion of said melt supplied to said returning blocking zone; and drive means operatively connected to said screw means in said return-blocking zone, wherein said screw means comprises screw core means and at least first and second screw flight portions helically disposed around said screw core means wherein said first screw flight portion is located in said returning blocking zone and said second flight portion is located in at least said reverse degassing zone; said screw flight portions each defining a screw pitch wherein said screw pitch defined by said first flight portion is smaller than said screw pitch defined by said second flight.

3. An extrusion device as recited in claim 2 wherein said thermoplastic plastics material is fed into said feed zone in granular form, said device further including means for melting said granular material and wherein said by-pass conduit communicates said conveying zone to said blocking return zone.

4. An extrusion device as recited in claim 2 wherein said by-pass conduit communicates said feed zone to said blocking return zone.

5. An extrusion device as recited in claim 2 wherein said thermoplastic plastics material enters said feed conduit in molten form and said by-pass conduit communicates said feed conduit to said blocking return zone.

* * * * *